(12) United States Patent
Berbakov et al.

(10) Patent No.: US 6,547,039 B2
(45) Date of Patent: *Apr. 15, 2003

(54) WIRE ROPE LUBRICATION DEVICE FOR A CRANE

(75) Inventors: Paul John Berbakov, Norton, OH (US); Steven Paul Clark, Forest, VA (US); Afif Michel Labaki, New Orleans, LA (US); Edward Stephen Robitz, North Canton, OH (US)

(73) Assignee: J. Ray McDermott, S.A., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/106,697

(22) Filed: Mar. 26, 2002

(65) Prior Publication Data

US 2002/0096400 A1 Jul. 25, 2002

Related U.S. Application Data

(62) Division of application No. 09/557,433, filed on Apr. 25, 2000, now Pat. No. 6,446,756.

(51) Int. Cl.[7] .............................................. F16N 13/22
(52) U.S. Cl. ........................................ 184/15.2; 184/17
(58) Field of Search ............................. 184/15.1, 15.2, 184/15.3, 17; 474/91

(56) References Cited

U.S. PATENT DOCUMENTS

| 3,951,235 A | * | 4/1976 | Acerbi ...................... 184/15.1 |
| 4,638,761 A | * | 1/1987 | Carrick ....................... 118/208 |
| 5,368,128 A | * | 11/1994 | Waldchen ................... 184/15.1 |
| 5,535,695 A | * | 7/1996 | Southwell ............... 114/221 R |

FOREIGN PATENT DOCUMENTS

FR    PCT/FR90/00546    * 7/1990

* cited by examiner

*Primary Examiner*—David Fenstermacher
(74) *Attorney, Agent, or Firm*—D. Neil LaHaye; Robert C. Baraona; Eric Marich

(57) ABSTRACT

Lubrication devices for lubricating wire rope on a crane. Spray nozzles may be permanently mounted to the multi-sheaved wire block assemblies. A controller and oil supply located near the base of the crane are used to control and deliver oil to the spray nozzles. A telescopic spray unit is used to lubricate the vertical stationary wire rope. A crawler that rides on the wire rope is used to lubricate the stationary wire rope between the anchor point and the first sheave of the block assembly. Improved clamshell units are used to lubricate the wire rope between the drums storing wire rope and the first sheave.

4 Claims, 6 Drawing Sheets

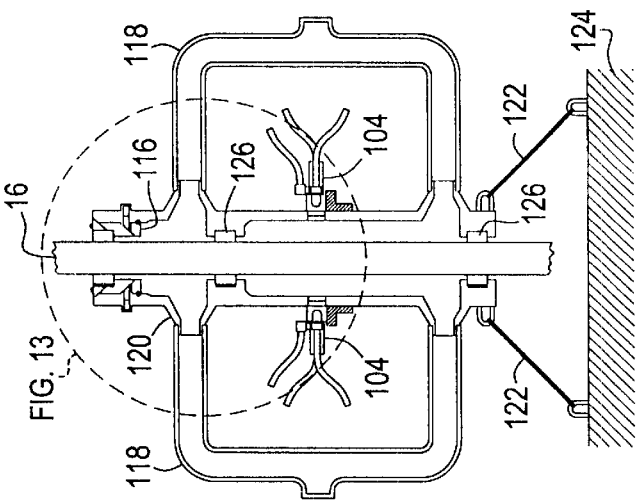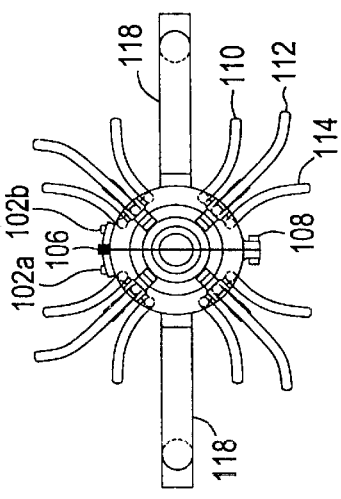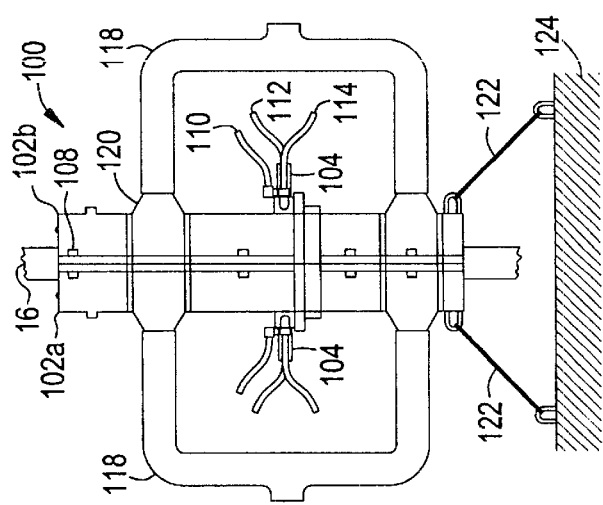

WIRE ROPE LUBRICATION DEVICE FOR A CRANE

This application is a division of application Ser. No. 09/557,433 filed on Apr. 25, 2000, now U.S. Pat. No. 6,446,756.

BACKGROUND OF THE INVENTION

1. Field of the Invention

The invention is generally related to the lubrication of wire ropes and more particularly to the in situ lubrication of wire ropes on cranes.

2. General Background

Wire rope is a flexible, tough, complex, and versatile mechanical power transmission member made up of numerous individual wires. During normal operation these wires are subject to torsion, bending, tension, and compression stresses. To achieve maximum performance and life, lubrication of the wire rope structure must be maintained so that coordinated sliding action between individual wires permits most favorable distribution of these stresses. Good lubrication offers protection against corrosion and minimizes metal-to-metal contact between individual wires while reducing wear on the rope and on the drum and sheaves over which it operates.

Wire rope used on cranes typically is pre-lubed by the manufacturer with a base lubricant. Typically, this is a thick lubricant with very high viscosity (10 to 30,000 SUS) that provides good protection during storage. However, to perform properly, a wire rope must also be field lubricated periodically. For this post-lube application a lighter viscosity oil such as 150 SUS must be applied to the rope because, during operation, tensions in the rope and pressure encountered while operating over sheaves and drums all work toward forcing the original lubricant to the rope surface. New oil is needed to counteract that action.

Field lubrication of wire rope has traditionally been done by one or more methods. A stationary device may be positioned such that it surrounds the wire rope in a continuous bath and lubricates the rope as it moves through the device. Lubricant may be dripped or poured on the wire rope and the excess then wiped off. Lubricant may be swabbed or painted on the wire rope. Some of these operations must be done manually.

The nature of large cranes, especially those used on derrick barges for offshore work, precludes the use of most of the current lubrication methods for several reasons. Large cranes have miles of wire rope, some of which moves in excess of one hundred feet per minute. Cranes achieve a mechanical advantage by the use of multi-sheaved wire rope block assemblies. This creates numerous closely spaced wire loops, which make in-situ lubrication very difficult. Conventional wire rope lubricators are not well suited to address a plurality of closely spaced wires due to the large size of the lubricators and their inability to operate in hands-off mode (they require constant attention and adjustment). Current lubrication devices are not designed for a plurality of wire ropes like the ones present in a multi-sheaved wire rope assembly. Current lubrication devices can not be installed and maintained in inaccessible locations like the boom of a derrick crane or the main block of a multi-sheaved hoist. Current lubrication devices are typically stationary but rely on relative motion between wire and lubricator. One such device is the pressurized clamshell lubricator. Pressurized clamshell lubricators have a split-housing chamber with round openings in their axial direction. The wire rope is fed through the axial openings and bathed in lubricant. Current clamshell units have disadvantages. They require a lot of time to set up and take down. Also, they must be removed during normal crane operation. Bathing the wire rope in lubricant tends to use excess lubricant that is not required. This wastes lubricant and causes pollution problems. In a crane, portions of the wire rope are stationary once installed. Thus, a stationary lubrication device is ineffective for those portions of wire rope.

It can be seen that the current state of the art does not address all needs in lubricating wire rope on cranes.

SUMMARY OF THE INVENTION

The invention allows for lubrication of the entire length of wire rope in a crane after wire is installed. This is done with the various devices that are described herein. Spray nozzles may be permanently mounted to the multi-sheaved wire block assemblies. A controller and oil supply located near the base of the crane are used to control and deliver oil to the spray nozzles. A telescopic spray unit is used to lubricate the vertical stationary wire rope. A crawler that rides on the wire rope is used to lubricate the stationary wire rope between the anchor point and the first sheave of the block assembly. Improved clamshell units are used to lubricate the wire rope between the drums storing wire rope and the first sheave.

BRIEF DESCRIPTION OF THE DRAWINGS

For a further understanding of the nature and objects of the present invention reference should be made to the following description, taken in conjunction with the accompanying drawings in which like parts are given like reference numerals, and wherein:

FIG. 10 is an elevation view of an improved clamshell lubricating device.

FIG. 11 is a top view of the device shown in FIG. 10.

FIG. 12 is a cutaway view of the clamshell device of FIG. 10.

FIG. 13 is an enlarged view of the area indicated in FIG. 12.

DETAILED DESCRIPTION OF THE PREFERRED EMBODIMENT

Figure 1:
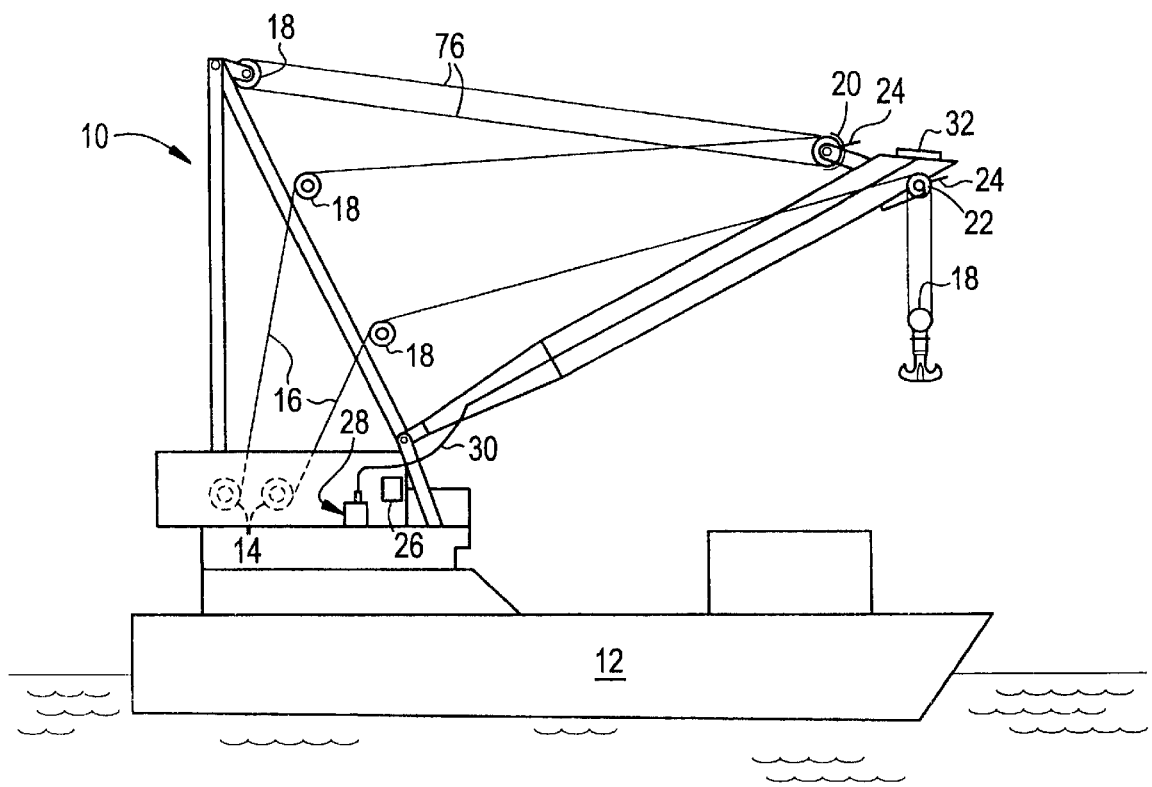
FIG. 1 is an elevation view of a crane on a barge.

Referring to the drawings, FIG. 1 indicates a typical crane 10 on a barge 12. Wire spools 14 hold a supply of wire rope 16 that is threaded around a series of pulleys 18, a boom sheave block 20, and a hoist sheave block 22. The sheave blocks typically are multi-sheave units that require multiple wraps of the wire rope.

A wire rope lubrication apparatus provided for the wire rope at the sheave blocks is generally comprised of spray nozzles 24, a controller 26, an oil supply 28, an air/oil line 30, and flow control means 32.

Figure 4:
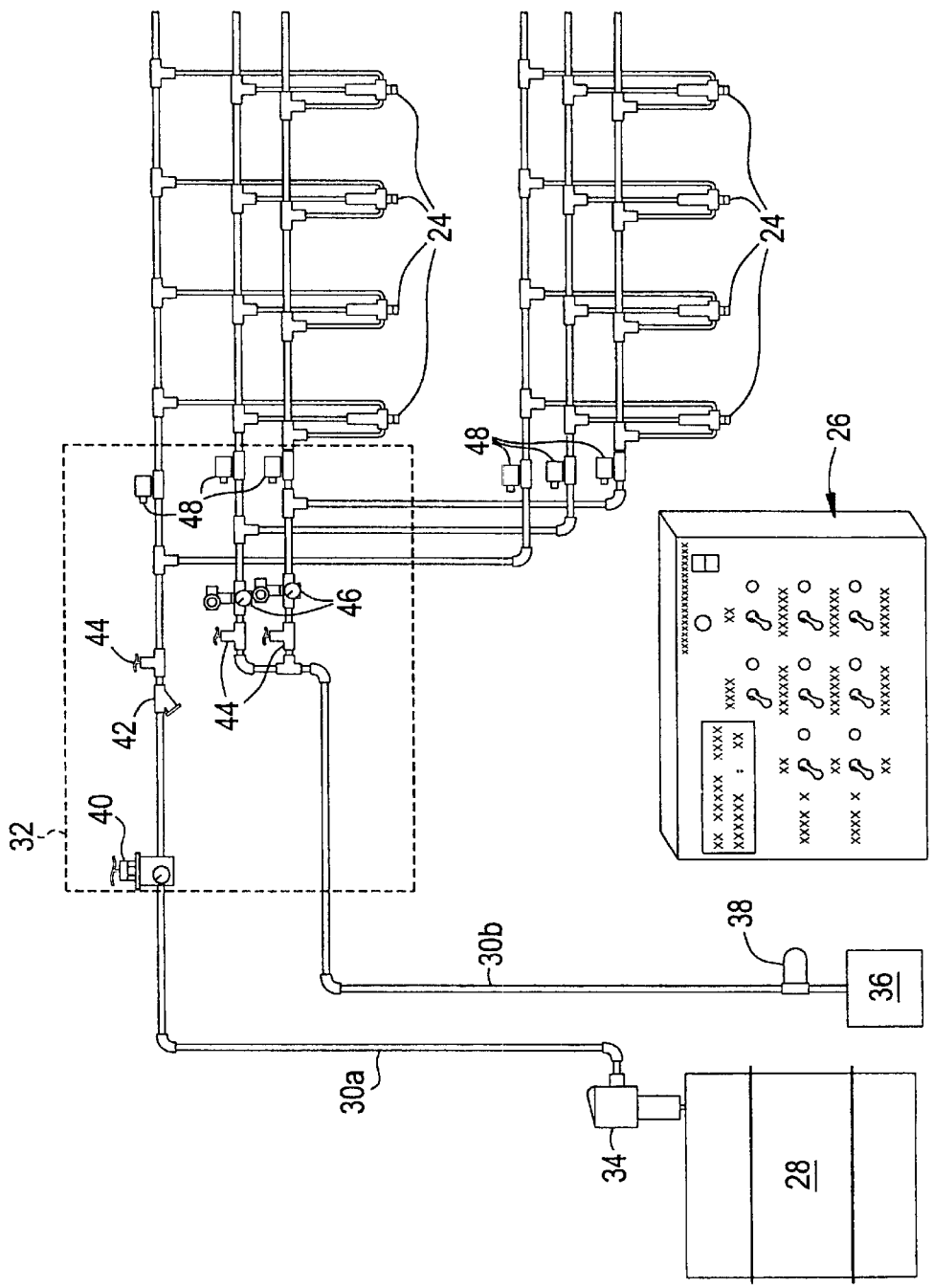
FIG. 4 is a schematic illustration of the spray nozzle arrangement.

FIG. 4 schematically illustrates the apparatus. A pump 34 directs oil from the oil supply 28 into the oil line 30a. A compressed air source 36 supplies compressed air to the air line 30b through air filter 38. Flow controls 32 are comprised of a liquid pressure regulator 40, oil filter 42, shut-off valves 44, air pressure regulators 46, and solenoid valves 48. Shut-off valves 44 are used to block the flow of fluids during preventive maintenance operations. Solenoid valves 48 activate the spray nozzle arrangement to spray lubricant on the wire rope through the nozzles 24.

Figure 2:
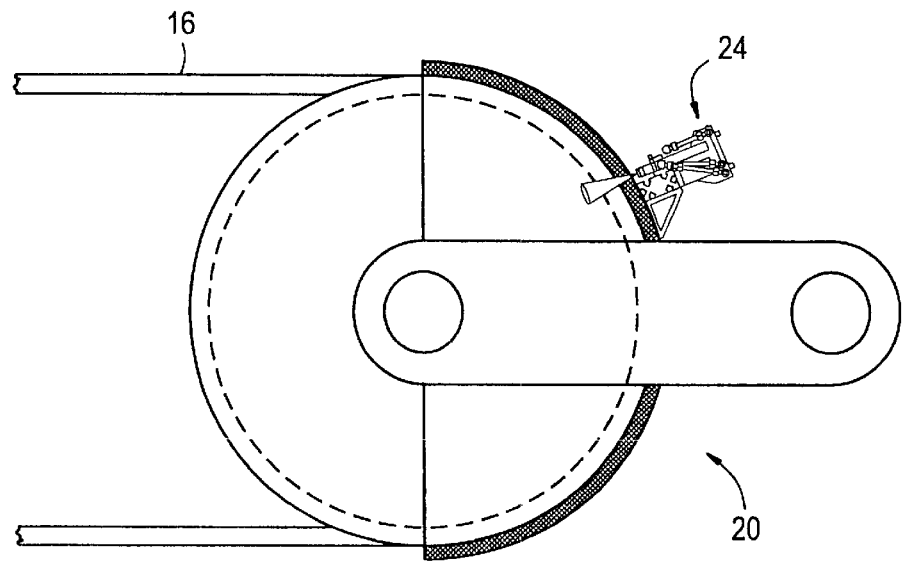
FIG. 2 illustrates a spray nozzle mounted on a sheave block.
Figure 3:
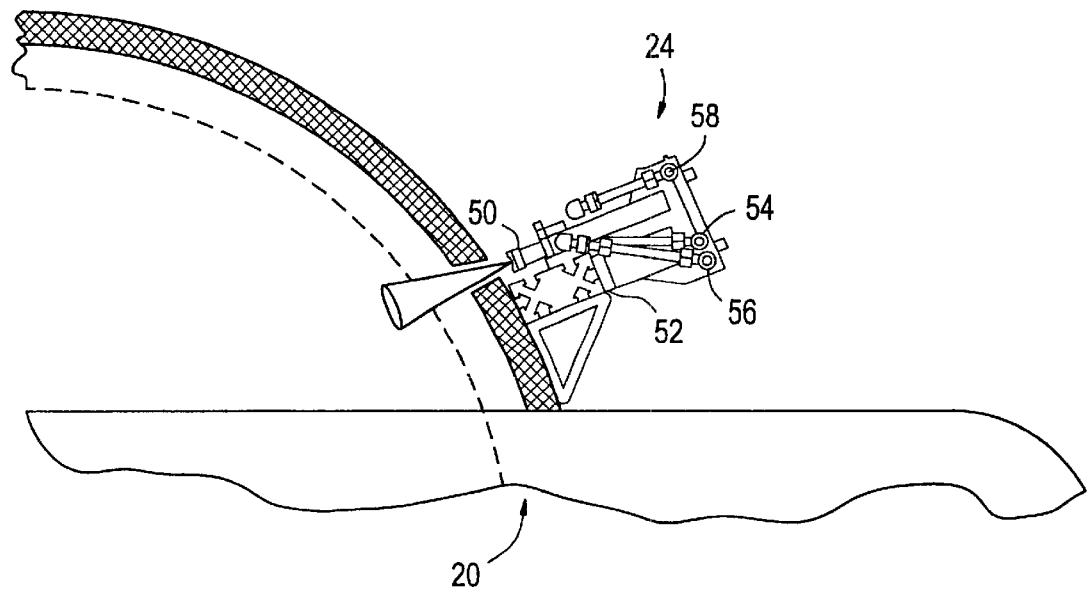
FIG. 3 is an enlarged view of FIG. 2.

FIG. 2 and 3 illustrate the mounting of the spray nozzle 24 on a sheave block 20 and a detail view of the spray nozzle arrangement. An atomizing nozzle 50 is housed in a bracket 52 mounted on the sheave block 20. Low pressure air from line 54 is used to atomize lubricant delivered through lubricant line 56. A high pressure air line 58 is used to activate a piston (not shown) in a cylinder that cleans the orifice of the atomizing nozzle 50. Although only one spray nozzle arrangement is shown and described, it should be understood that a plurality of spray nozzle arrangements may be provided to accommodate all wraps of the wire rope 16 around the multiple sheaves of the block.

In operation, an operator uses the controller 26 as necessary to direct lubricant to the wire rope on the sheave blocks.

Figure 5:
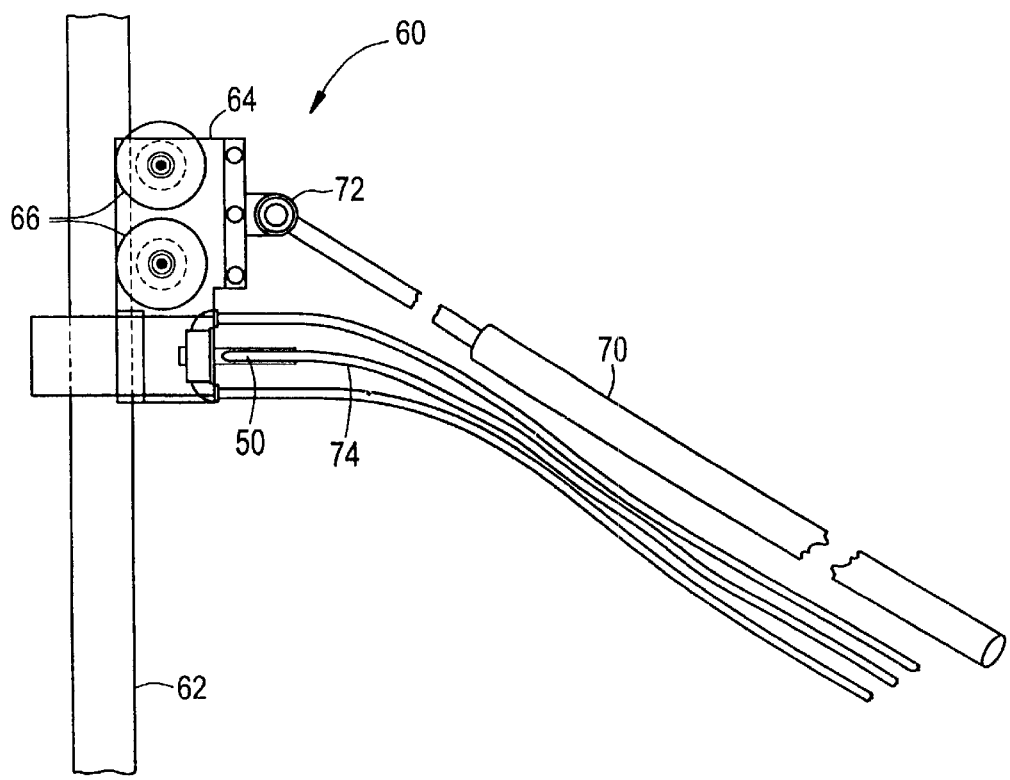
FIG. 5 is an elevation view of a manual lubricating device.
Figure 6:
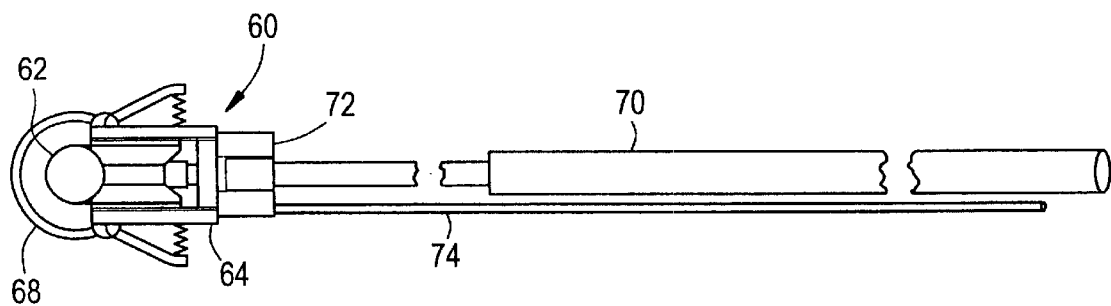
FIG. 6 is a top view of the device of FIG. 5.

FIG. 5 and 6 illustrate a manual wire rope lubricating device 60 that is particularly suitable for lubricating the vertical stationary wire ropes 62 (at the anchor point of a block) that can not be lubricated by in-line lubrication devices. Lubricating device 60 is comprised of an atomizing nozzle 50 mounted in a body 64. Body 64 is provided with a plurality of concave wheels 66 either rotatably mounted therein or locked to function as skids. Wheels 66 are sized to be received on the stationary wire rope 62 to provide guidance and keep the nozzle 50 at the proper attitude and location. One end of the body 64 is provided with a hinged, spring loaded shroud 68 to provide for ease of placing on the wire rope 62. A telescoping handle 70 is pivotally attached at 72 as illustrated. Oil and air are supplied to the nozzle 50 via line 74. Oil and air can be supplied with a pressurized canister not shown having both fluids. Alternatively, air can be supplied with a conventional compressor and oil supplied by a positive displacement pump. Fluid pressure regulators will be mounted near the source. An operator opens the hinged shroud 68, places the wheels 66 against the wire rope 62, closes the shroud 68, turns on the air and oil supply and then uses the handle to move the device along the length of wire rope 62. The oil discharge from the nozzle lubricates the wire rope. The shroud 68 captures excess oil and swirls the atomized oil around the wire rope 62.

Figure 7:
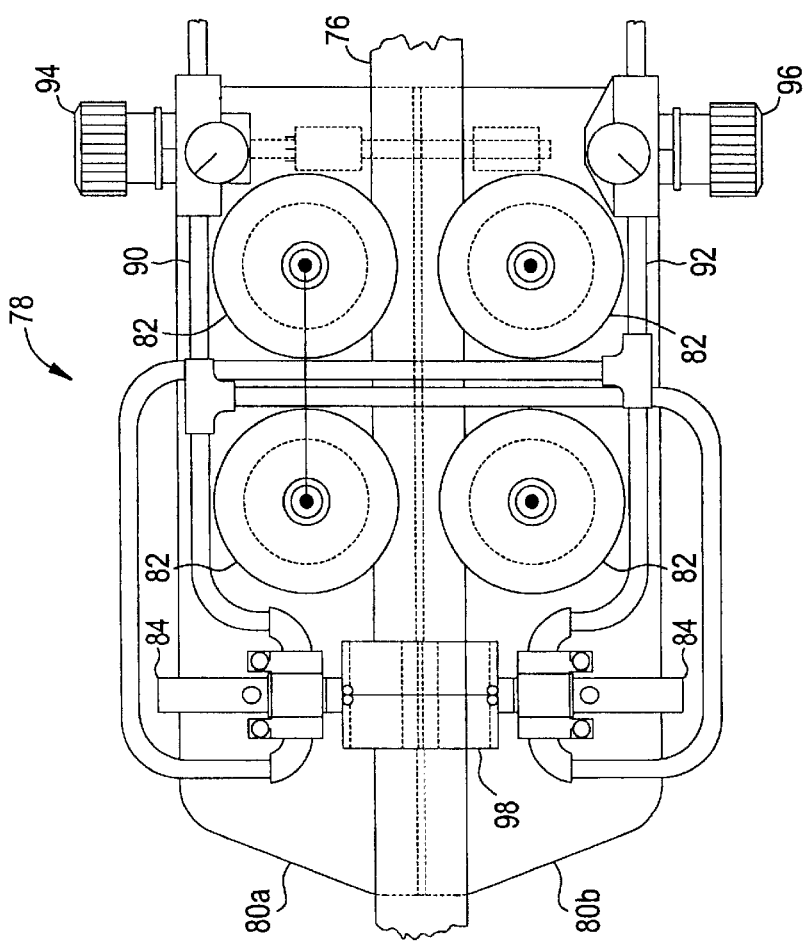
FIG. 7 is a plan view of a crawler lubrication device.

A portion of the wire rope that is used by cranes with multi-sheaved block assemblies never moves in relation to the sheaves or the rest of the structure. This section comprises the wire rope that is located between the anchor point and the first sheave of the block assembly. This section of wire rope is indicated by numeral 76 in FIG. 1. FIG. 7 illustrates a crawler lubricating device 78 particularly suited to this section of wire rope.

Figure 9:
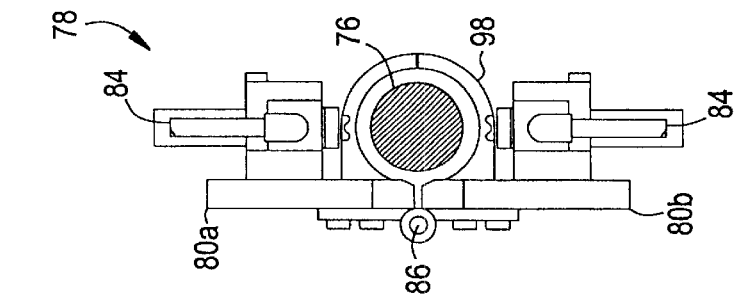
FIG. 9 is an end view of the crawler device installed on a wire rope.
Figure 8:
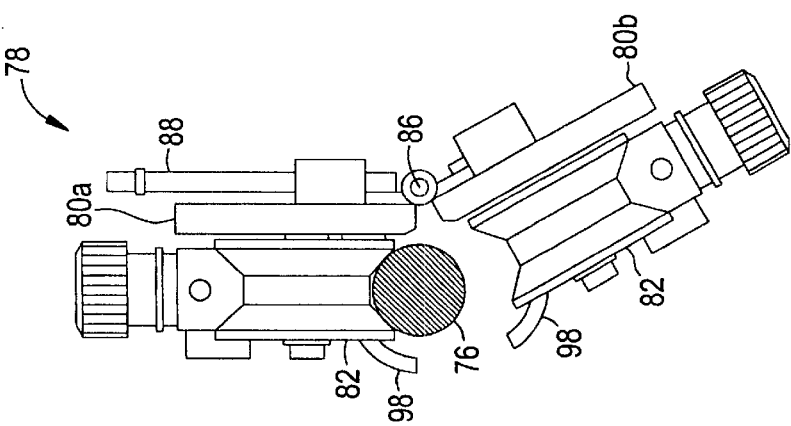
FIG. 8 is an end view of the crawler device being installed on a wire rope.

As seen in FIG. 7–9 the crawler lubricating device 78 is generally comprised of a body formed from two halves 80a,b, a plurality of wheels 82 either rotatably mounted or locked as skids in the body, and atomizing spray nozzles 84. The two body halves 80a,b are attached together by a hinge 86 to allow for quick installation over a wire rope 76. Once the crawler is placed over the wire rope 76, the body is locked over the wire rope with a locking pin 88 to prevent the crawler from falling during the lubrication phase.

The wheels 82 are concave and sized to receive the wire rope 76 to be lubricated. The wheels 82, as shaped, will roll or skid on the wire rope 76 regardless of orientation with respect to gravity.

The atomizing spray nozzles 84 are similar to those described above in that both air and oil are used simultaneously to create a pressurized fog of lubricant fluid. The nozzles 84 are mounted and positioned on the body 80a,b so as to direct the atomized oil toward the wire rope 76 as the crawler moves along the wire rope. An air line 90 and oil line 92 are mounted on the body 80a,b and in fluid communication with the nozzles 84.

The air and oil lines are in communication with an air supply and oil supply not shown. An air pressure regulator 94 and oil pressure regulator 96 are mounted on the body 80a,b for adjusting the atomized spray as necessary. By mounting here, the fluid pressures are automatically compensated for changes in elevation, assuring constant fluid flow.

A shroud 98 may be provided to capture excess oil and to swirl the atomized oil around the wire rope 76. The shroud is formed from two portions attached to each body portion 80a,b.

The crawler 78 can be pulled with a flexible cable attached to an air tugger or it can be pulled manually by an operator located on the opposite end of the multi-sheaved block assembly.

FIG. 10–13 illustrate an improved clamshell lubricating device 100 that is generally comprised of a body formed from two halves 102a,b and atomizing spray nozzles 104.

The two body halves 102a,b are attached together by a hinge 106 to allow for quick installation over a wire rope 16. The body halves are held in the closed position over the wire rope by bolts or screws 108 threaded through flanges on the body halves. The body 102 is open at each end to allow passage of the wire rope 16 therethrough.

A plurality of atomizing spray nozzles 104 are mounted in the body 102 and positioned to direct the atomized oil toward the wire rope 16. As described above, each nozzle 104 has a high pressure air line 110, a low pressure air line 112, and an oil line 114. The high pressure air line is used to activate a piston not shown that cleans the orifice in the nozzle. The low pressure air and oil lines are used to supply air and oil pressure from sources not shown to spray atomized oil on the wire rope.

One or more air jets 116 may be formed in the body 102 to blow debris off the wire rope 16 before it is lubricated. High pressure air is supplied through intake ports 117, which are in communication with a source not shown. An O-ring may be provided at the inner portion of the body 102 around the intake ports 117 if necessary to provide the proper seal. An exhaust manifold 118 may be provided and connected to a vacuum source not shown for removing the debris loosened by the air jet 116. The exhaust manifold 118 is connected to ports 120 provided on the body 102.

A seal 126 may be provided at each end of the body 102 and between the cleaning section and the lubrication section. The seals 126 are preferably formed from a compliant material such as rubber or a cylindrical brush. The seals serve to minimize the amount of debris that enters the body 102 and the amount of excess lubrication fluid that escapes the lubrication section.

Chain or cable 122 is used to secure the clamshell device 100 to a stationary structure 124. The lateral flexibility provided by the chain or cable is necessary if the device is mounted near the spool that stores and pays out the wire rope.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A crawler device for lubricating wire rope, comprising:
  a. a body formed from two halves hinged together such that the two body halves are movable between an open position and a closed position around the wire rope to be lubricated;
  b. means for locking the two body halves in the closed position;
  c. an atomizing spray nozzle mounted in said body and positioned to direct atomized lubricant to the wire rope;
  d. a plurality of wheels rotatably mounted in said body, said wheels designed to contact and roll on the wire rope regardless of orientation with respect to gravity; and
  e. a shroud attached to said body halves, said shroud surrounding the wire rope to be lubricated when said body halves are in the closed position.

2. The device of claim 1, wherein air pressure is used to atomize the lubricating fluid directed to the wire rope.

3. The device of claim 2, further comprising means mounted on the crawler device for controlling the pressure of the air and lubricating fluid delivered to said pray nozzles.

4. The device of claim 1, wherein said wheels are locked as skids in said body.

* * * * *